June 14, 1932.  J. HAAS  1,862,747
POULTRY BAND
Filed Aug. 3, 1931
Fig. 1.
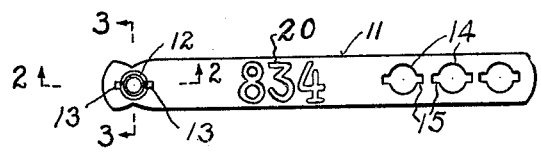
Fig. 2.  Fig. 3.
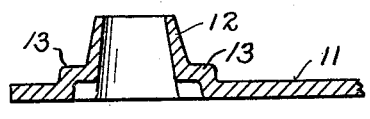 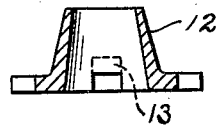
Fig. 4.  Fig. 5.
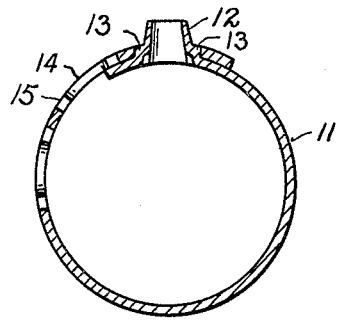 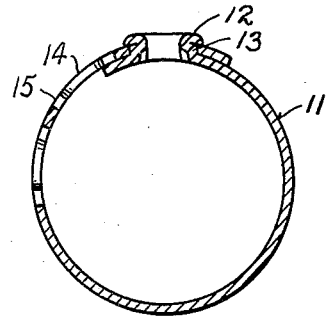
Fig. 6.  Fig. 7.
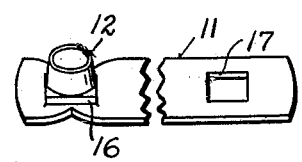 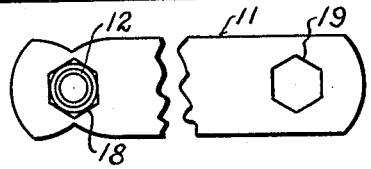
INVENTOR.
JOSEPH HAAS.
BY
H.C. Kavel.
ATTORNEY.

Patented June 14, 1932

1,862,747

UNITED STATES PATENT OFFICE

JOSEPH HAAS, OF NEWPORT, KENTUCKY

POULTRY BAND

Application filed August 3, 1931. Serial No. 554,673.

My invention relates to an improved poultry band of the type adapted to be secured to the leg of a fowl or other animal.

One of the objects of my invention is to provide an improved band, the ends of which are adapted to be secured together by means of a rivet, and means to hold the over-lapped ends of the band in position against relative lateral or longitudinal movement which would tend to shear or wear the shank of the rivet.

Another object is to provide a band with engaging means formed into the rivet and cooperating sockets in the openings at the other end of the band for locking the two ends together in an over-lapped relation to prevent lateral movement. My invention will be further readily understood from the following description and claims and from the drawing in which latter:

Fig. 1 is a plan view of my improved band.

Fig. 2 is an enlarged cross-sectional detail of the same taken on the line 2—2 of Fig. 1.

Fig. 3 is an enlarged cross-sectional detail of the same taken on the line 3—3 of Fig. 1.

Fig. 4 is an enlarged sectional view showing the band in over-lapped relation prior to clinching the rivet.

Fig. 5 is a similar view with the rivet clinched.

Fig. 6 is a perspective view of a modified form of my invention and,

Fig. 7 is a plan view of a further modification of the same.

My device comprises a thin stamped flexible sheet metal band 11, provided with an integral rivet head or stud 12, adjacent one end thereof. In the preferred form in forming the rivet, which is pressed or punched from the metal, I prefer to form the rivet with a pair of keys 13 adjacent to the base. These pressed out portions preferably extend above the surface of the band to a height equal to the thickness of the band. Adjacent to the other end of the band, I provide a series of openings 14, provided with slots 15, arranged to fit over the keys 13, when the band is brought into over-lapped relation for preventing any possible lateral or longitudinal movement of the two ends of the band which would tend to wear or shear the rivet.

When the ends of the band are brought together in over-lapped relation, the rivet is clinched by means of any suitable clinching tool and securely locks the two ends of the band together. I prefer to form the rivet with its upper extension substantially circular and open at its top, whereby the usual rivet clinching tool may be used. In Fig. 6, I have shown a modified form of my invention wherein the base of the rivet is formed in a square as at 16 and also provide a square aperture 17 in the other end of the band for engagement with the rivet. In Fig. 7 I show a hexagon formed base 18 on the rivet and the hexagon aperture 19 for engagement therewith. It is obvious that various other shapes may be provided which would maintain the two ends of the band when brought together in double locked relation.

Suitable identification marks may be placed on the band as indicated at 20 to permanently mark the registration number of the fowl to which the band is applied.

Many changes could be made in the above construction without departing from the spirit or scope of the appended claims. It is intended that all matter contained in the accompanying specification and drawing shall be interpreted as illustrative and not in a limiting sense.

Having thus fully described my invention, what I claim as new and desire to secure by Letters Patent, is:

1. A poultry band comprising a flexible metallic strip provided at opposite ends with an opening and an open topped integral stud respectively, impressions forming keys in the base of said stud and cooperating extending slots in said openings, whereby on the ends of the band being brought together said keys locate in said slots to prevent lateral movement of said engaging ends.

2. A poultry band comprising a flexible metallic strip provided with an open topped integral stud at one end and a series of openings provided with key-ways at the other end, keys formed in the base of said stud for forming cooperating locking means with said key-ways when said ends are brought into over-lapping relation and said stud is clinched.

3. A poultry band comprising a flexible metallic strip provided with an open topped circular integral stud at one end and a series of openings provided with key-ways at the other end, keys formed in the base of said stud for forming cooperating locking means with said key-ways when said ends are brought into over-lapping relation and said stud is clinched.

4. A poultry band comprising a flexible metallic strip provided with a circular open topped integral stud at one end and a series of openings at the other end, a formation on the base of said stud formed in a shape other than circular, said openings formed in a shape to fit said formation on the base of said stud, whereby upon clinching said stud said ends will be locked against lateral movement.

In testimony whereof, I have hereunto signed my name.

JOSEPH HAAS.